US009301302B2

(12) United States Patent
Sundberg et al.

(10) Patent No.: US 9,301,302 B2
(45) Date of Patent: Mar. 29, 2016

(54) DOWNLINK MULTICARRIER MOBILE COMMUNICATION NETWORK CONFIGURATION

(71) Applicant: Telefonaktiebolaget L M Ericsson (publ), Stockholm (SE)

(72) Inventors: Mårten Sundberg, Årsta (SE); Olof Liberg, Beijing (CN); Paul Schliwa-Bertling, Ljungsbro (SE); Sajal Kumar Das, Bangalore (IN); Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 442 days.

(21) Appl. No.: 13/817,941

(22) PCT Filed: Jan. 30, 2013

(86) PCT No.: PCT/EP2013/051804
§ 371 (c)(1),
(2) Date: Feb. 20, 2013

(87) PCT Pub. No.: WO2013/120695
PCT Pub. Date: Aug. 22, 2013

(65) Prior Publication Data
US 2014/0071901 A1    Mar. 13, 2014

(30) Foreign Application Priority Data
Feb. 15, 2012 (IN) .............................. 430/DEL/2012

(51) Int. Cl.
*H04W 72/04* (2009.01)
*H04L 5/00* (2006.01)
*H04W 8/22* (2009.01)

(52) U.S. Cl.
CPC ......... *H04W 72/0453* (2013.01); *H04L 5/0042* (2013.01); *H04L 5/0094* (2013.01); *H04L 5/0044* (2013.01); *H04W 8/22* (2013.01); *H04W 72/048* (2013.01)

(58) Field of Classification Search
CPC . H04W 72/048; H04W 8/22; H04W 72/0453; H04L 5/0042; H04L 5/0044; H04L 5/0094
USPC ..................... 370/329; 455/422.1, 450, 550.1
See application file for complete search history.

(56) References Cited

U.S. PATENT DOCUMENTS

2004/0029579 A1 * 2/2004 Kashiwase .................... 455/424
2009/0257387 A1 * 10/2009 Gholmieh et al. ............ 370/329
(Continued)

FOREIGN PATENT DOCUMENTS

EP    2 400 790 A1    12/2011
GB    2 437 130 A     10/2007
(Continued)

OTHER PUBLICATIONS

International Search Report, PCT Application No. PCT/EP2013/051804, Apr. 24, 2013.
(Continued)

*Primary Examiner* — Un C Cho
*Assistant Examiner* — Shah Rahman
(74) *Attorney, Agent, or Firm* — Myers Bigel & Sibley, P.A.

(57) ABSTRACT

The disclosure relates to a method in a mobile communication network for configuring the network for downlink multicarrier data transmission from a network node to a mobile terminal. The method includes the step (210) of receiving a mobile terminal capability signalling in a network node. In a subsequent step (220) at least two carriers are assigned to the mobile terminal in a downlink multicarrier assignment based on information received in the mobile terminal capability signalling. The method also includes a further step of allocating (230), in each radio block period, one or more of the assigned carriers for communication with the mobile terminal.
The disclosure also relates to a mobile terminal configured to receive downlink multicarrier data transmission, and a network node configured for downlink multicarrier data transmission.

15 Claims, 9 Drawing Sheets

(56) References Cited

U.S. PATENT DOCUMENTS

| | | | |
|---|---|---|---|
| 2009/0257390 | A1 | 10/2009 | Ji et al. |
| 2010/0272051 | A1 | 10/2010 | Fu et al. |
| 2011/0216730 | A1* | 9/2011 | Kim et al. ............... 370/329 |
| 2011/0261704 | A1* | 10/2011 | Etemad ................... 370/252 |
| 2012/0113866 | A1* | 5/2012 | Tenny et al. ............. 370/254 |
| 2012/0177147 | A1* | 7/2012 | Park ................ H04L 27/2647 |
| | | | 375/316 |
| 2013/0344883 | A1* | 12/2013 | Rinne ............... H04W 72/0453 |
| | | | 455/452.1 |

FOREIGN PATENT DOCUMENTS

| | | |
|---|---|---|
| WO | WO 2010/027186 A2 | 3/2010 |
| WO | WO 2011/011636 A2 | 1/2011 |
| WO | WO 2011/098124 A1 | 8/2011 |

OTHER PUBLICATIONS

Written Opinion of the International Searching Authority, PCT Application No. PCT/EP2013/051804, Apr. 24, 2013.

3GPP TS 43.064 V7.13.0 (May 2009) "$3^{rd}$ Generation Partnership Project; Technical Specification Group GSM/EDGE Radio Access Network; General Packet Radio Service (GPRS); Overall description of the GPRS radio interface; Stage 2 (Release 7)", 650 Route des Lucioles—Sophia Antipolis, Valbonne—France; 105 pages.

3GPP TR 45.912 V 7.2.0 (Feb. 2007) "$3^{rd}$ Generation Partnership Project; Technical Specification Group GSM/EDGE Radio Access Network; Feasibility study for evolved GSM/EDGE Radio Access Network (GERAN) (Release 7)", 650 Route des Lucioles—Sophia Antipolis, Valbonne—France; 517 pages.

3GPP TS 51.021 V 7.10.0 (May 2010) "$3^{rd}$ Generation Partnership Project; Technical Specification Group GSM/EDGE Radio Access Network; Base Statio System (BSS) equipment specification; Radio aspects (Release 7)", 650 Route des Lucioles—Sophia Antipolis, Valbonne—France; 192 pages.

3GPP TS 24.008 V7.15.0 (Mar. 2010) "$3^{rd}$ Generation Partnership Project; Technical Specification Group Core Network and Terminals; Mobile radio interface Layer 3 specification; Core network protocols; Stage 3 (Release 7)", 650 Route des Lucioles—Sophia Antipolis, Valbonne—France; 550 pages.

3GPP TS 45.002 V7.8.0 (Mar. 2011) "$3^{rd}$ Generation Partnership Project; Technical Specification Group GSM/EDGE Radio Access Network; Multiplexing and multiple access on the radio path (Release 7)", 650 Route des Lucioles—Sophia Antipolis, Valbonne—France; 105 pages.

3GPP TS 44.018 V7.20.0 (Dec. 2011) "$3^{rd}$ Generation Partnership Project; Technical Specification Group GSM/EDGE Radio Access Network; Mobile radio interface layer 3 specification; RadioResource Control (RRC) protocol (Release 7)", 650 Route des Lucioles—Sophia Antipolis, Valbonne—France; 401 pages.

Written Opinion of the International Preliminary Examining Authority, PCT Application No. PCT/EP2013/051804, Feb. 13, 2014, 8 pages.

* cited by examiner

| Radio block Period | 0 | 1 |
|---|---|---|
| Carrier 1 | v | v |
| Carrier 2 | x | v |
| Carrier 3 | x | v |
| v – radio block received x- radio block not received | | |

| TDMA | 0 | 1 | 2 | 3 | 4 | 5 | 6 | 7 |
|---|---|---|---|---|---|---|---|---|
| Radio block Period | 0 | | | | 1 | | | |
| Burst | 0 | 1 | 2 | 3 | 0 | 1 | 2 | 3 |
| Carrier 1 | v | v | v | v | v | v | v | v |
| Carrier 2 | X | v | v | v | v | v | v | v |
| Carrier 3 | v | v | X | X | v | v | v | v |
| v – Burst of carrier received | | | | | | | | |
| x – Burst of carrier not received | | | | | | | | |

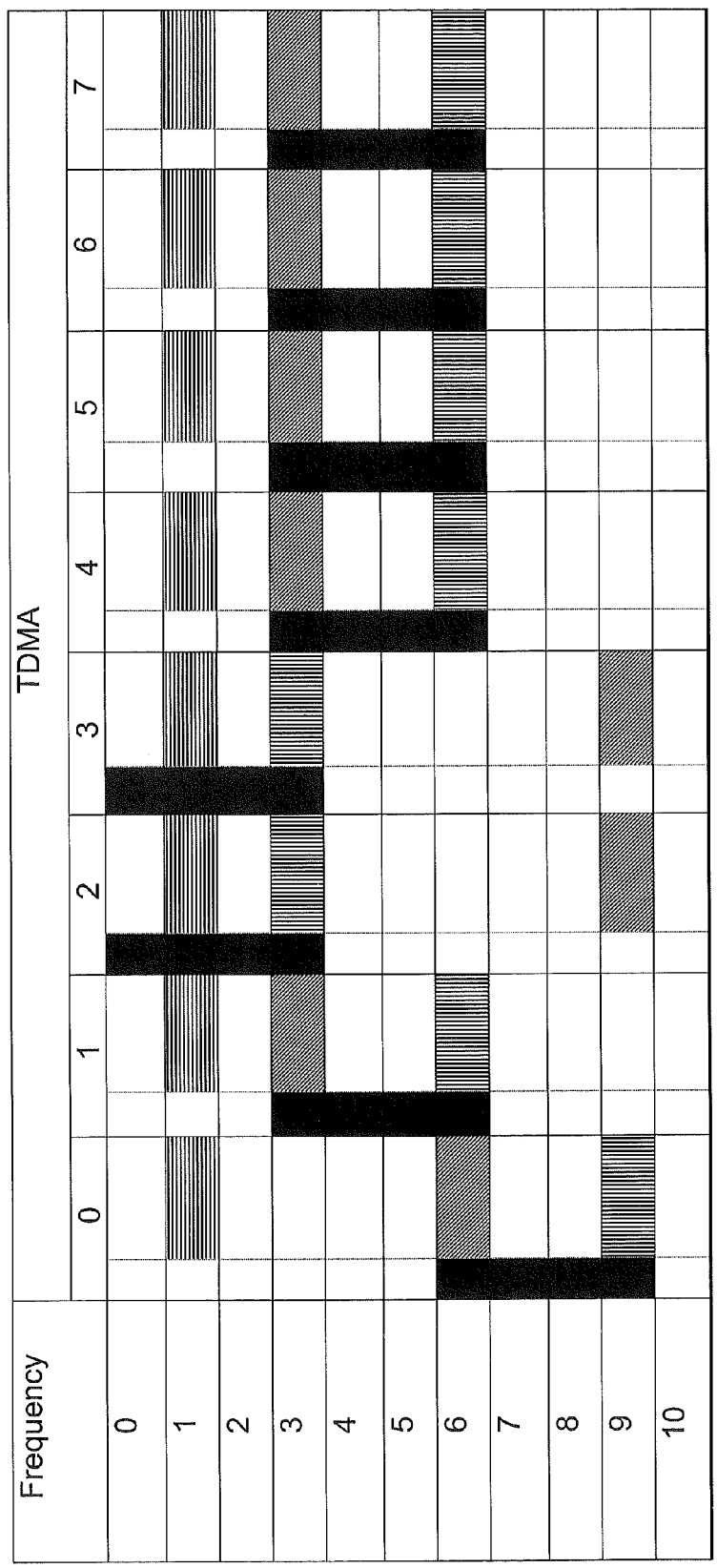

000# DOWNLINK MULTICARRIER MOBILE COMMUNICATION NETWORK CONFIGURATION

CROSS REFERENCE TO RELATED APPLICATIONS

This application is a 35 U.S.C. §371 national stage application of PCT International Application No. PCT/EP2013/051804, filed on 30 Jan. 2013, which itself claims priority to Indian Patent Application No. 430/DEL/2012, filed 15 Feb. 2012, the disclosure and content of both of which are incorporated by reference herein in their entirety.

TECHNICAL FIELD

The present disclosure relates to a method in a mobile communication network for configuring the network for downlink data transmission from a network node to a mobile terminal. Particularly, the present disclosure relates to methods for downlink multicarrier assignment, a mobile terminal configured to receive downlink multicarrier data transmission, and a network node configured for multicarrier allocation for downlink data transmission.

BACKGROUND

In 3rd generation partnership project, 3GPP, GSM/EDGE radio access network, GERAN, Release 7, a number of features for packet switched transmission were included in the specifications. One of these features is Dual Carrier Downlink.

Dual carrier downlink, see e.g. Sub clause 3.3.4 in 3GPP TS43.064 enables two carriers to be simultaneously transmitted to the mobile while still only one simultaneous carrier is supported for uplink, UL, transmission.

Although the 3GPP specifications does not specify the receiver architecture, the Dual Carrier Downlink feature in Rel-7 was implemented assuming an implementation with multiple narrowband receivers and consequently the number of carriers were restricted to two. Dual carrier transmission was only applied on the downlink, DL, and there was no impact to the radio performance requirements or radio related testing for the terminal.

However, two different architectures of mobile implementation were discussed prior to standardization, namely multiple narrowband receivers and wideband receiver.

In the feasibility study for 3GPP GERAN Rel. 7, both dual carrier and multicarrier transmission in both UL and DL were considered. It was recognized that for multicarrier solutions, where the number of carriers is high, a wideband receiver is better suitable while for lower number of carriers, e.g. 2, multiple narrowband receivers is a simple extension of the current single carrier architecture, resulting in no, or little, impact to the physical layer.

The decision of limiting the scope to dual carriers in the DL can be found in 3GPP TR 45.912, Sub clause 5.1, "Feasibility study for evolved GSM/EDGE Radio Access Network (GERAN)":

"Given the current technical and implementation limitations, it is considered acceptable in an initial phase to restrict the number of carriers to two. The need for higher bit rates could make it desirable to support more than two carriers in future releases of the GERAN standards."

The introduction of downlink dual carrier is an extension of the single carrier case and achievable gains, e.g. peak throughput, scale linearly with the number of carriers used, i.e. using two carriers doubles the peak throughput achievable. Further additional gains can be achieved by using even more carriers. For example using four carriers will double the peak throughput achieved with dual carrier implementations.

However, when implementing multicarrier transmission with a use of multiple narrowband receivers, each additional carrier would correspond to one additional radio frequency RF front end for each carrier supported, resulting in a bulky and expensive terminal. There is a need for a more cost efficient implementation of multicarrier data transmission.

SUMMARY

It is an object of embodiments of the present disclosure to improve data transmission throughput in radio communication network by enabling a cost efficient implementation of multicarrier data transmission.

A method in a mobile communication network for configuring the network for downlink multicarrier data transmission from a network node to a mobile terminal is disclosed. The method includes the steps of receiving, in the network node, mobile terminal capability signaling; assigning at least two carriers to the mobile terminal in one or more downlink multicarrier assignments based on information received in the mobile terminal capability signaling; and allocating, in each radio block period, one or more of the assigned carriers for transmission to the mobile terminal.

In an example, the step of allocating further includes determining carriers possible to allocate includes determining in the mobile terminal carriers possible to receive and in the network node carriers possible to allocate.

In an example, the step of receiving mobile terminal capability signaling includes retrieving information on supported maximum carrier separation for the mobile terminal. Retrieving information on maximum carrier separation supported by the mobile terminal receiver provides an enhanced ability to select carrier(s) to allocate to the mobile terminal in any given radio block period.

In another example, the step of receiving mobile terminal capability signaling includes retrieving information on maximum number of carriers supported by the mobile terminal. Retrieving information on maximum number of carriers supported by the mobile terminal facilitates assignment of carriers.

In another example, the step of receiving mobile terminal capability signaling includes retrieving multislot capability reduction information for maximum number of downlink carriers. The reduction applies to the maximum number of downlink timeslots for multicarrier operation and limits the maximum number of resources possible to assign.

In a further example, the step of assigning at least two carriers in one or more downlink multicarrier assignment comprises assigning the carriers to the receiving mobile terminal by including information on the carrier assignment in one or more assignment message(s). Assignment messages have been defined for dual carrier reception and can advantageously be reconfigured to for multicarrier assignment.

In another example, the step of assigning at least two carriers in one or more downlink multicarrier assignment further includes assigning carriers according to prioritization of the one or more carriers and indicating the one or more prioritized carriers in the carrier assignment. By prioritizing carriers in the carrier assignment process, it is possible to easily select carriers when allocating carriers so that maximum throughput is achieved.

In a further example, the step of assigning one or more carriers in a downlink multicarrier assignment further includes signaling of a prioritized lowermost or uppermost frequency and allocating carriers covered by the signaled maximum carrier separation starting from the prioritized lowermost or uppermost frequency and indicating the lowermost or uppermost frequency in the carrier assignment. Prioritization of frequencies provides the advantage of simplifying implementation.

In another example, the carriers possible to allocate are determined by selecting carriers maximizing a number of full radio blocks, i.e. four bursts, possible to receive to assert that a maximum number of carriers are received by the mobile terminal. Assertion of reception of maximum number of carriers provides for carrier allocations that maximizes throughput.

In another example, a set of rules are determined for the step of allocating one or more of the carriers in a downlink multicarrier assignment, the rules depending on the signaled maximum carrier separation supported by the mobile terminal receiver, an absolute radio frequency channel, ARFC, number used during the radio block period; and/or a number of bursts received in each radio block period for each respective carrier.

In a further example, the combined throughput through all carriers are maximized, whereby a number N4 of channels are guaranteed to have four bursts in a radio block always with smaller or equal carrier separation compared to the signaled maximum carrier separation of the mobile terminal, a number N3 of channels are guaranteed to have at least three bursts in any radio block with smaller or equal carrier separation compared to the signaled maximum carrier separation of the mobile terminal, and a number N2 of bursts are guaranteed to have at least two bursts in any radio block with smaller or equal carrier separation compared to the signaled maximum carrier separation of the mobile terminal.

A second embodiment of the present disclosure relates to a mobile terminal in a mobile communication network. The mobile terminal includes at least one transmitter configured to send mobile terminal capability signaling. The mobile terminal also includes at least one receiver configured to receive data transmission from multiple downlink carriers from a network node, and a processor configured to tune the at least one wideband receiver for reception of data transmission on at least two carriers according to a downlink multicarrier assignment signaled from the network node.

A third embodiment of the present disclosure relates to a network node in a mobile communication network, configured for downlink multicarrier data transmission to a mobile terminal. The network node includes at least one receiver for receiving a mobile terminal capability signal. The network node further includes processor for processing the mobile terminal capability signal, to assign at least two carriers in one or more carrier assignments based on information received in the mobile terminal capability signal and to allocate, in each radio block period, at least two of the assigned carriers for transmission to the mobile terminal. The network node also includes a transmitter for transmitting at least one assignment message signaling the carrier assignment to a receiving mobile terminal.

The disclosure makes it possible to, by using the capabilities of a wideband receiver in the mobile terminal, extend the dual carrier feature in GERAN to apply to multiple carriers more than, or equal to, two. Thus, a more cost efficient dual/multicarrier solution is obtained compared to prior art solutions using multiple narrowband receivers. Also, synergy effects can be found in dual/tri mode terminals, with WCDMA and/or LTE support, where wider bandwidth than used for GSM is already supported by the hardware today.

Compared to the standardized solution of Downlink Dual Carrier, embodiments of the present disclosure allow the use of multiple carriers to be assigned to one mobile terminal on the downlink, increasing the maximum throughput achievable. Further, embodiments of the disclosure reduce the cost and size of dual/multicarrier downlink terminals that currently require two RF front ends to be implemented.

BRIEF DESCRIPTION OF THE DRAWINGS

The present disclosure will be more readily understood through the study of the following detailed description of the embodiments/aspects together with the accompanying drawings, of which:

FIG. 6 is a schematic illustration of a three carrier assignment with wideband receiver bandwidth 800 kHz; Carrier 2, illustrated by diagonal lines, as priority carrier, uppermost carrier

DETAILED DESCRIPTION

In the following sections, the implications to the 3GPP specifications by introducing a wideband multicarrier receiver are outlined. Aspects listed below need to be addressed in order to introduce a low cost, and feasible, alternative of downlink multicarrier support in GERAN.

The various steps described below in connection with the figures should be primarily understood in a logical sense, while each step may involve the communication of one or more specific messages depending on the implementation and protocols used. The shown units are also to be understood logically without limitation to possible implementation in practice.

Multicarrier technology was introduced in 3GPP GERAN specifications in Release 8 for the base station to allow for energy and cost efficient product implementations. A multicarrier network node, BS, is a BS characterized by the ability to, in addition to single carrier operation, process two or more carriers in common active components simultaneously, see Sub clause 3.1 in 3GPP TS51.021. The maximum achievable bandwidth of the transmitter/receiver is mainly limited by the possibility to linearize imperfections due to non-linear characteristics in the components used. This might limit the instantaneous bandwidth, IBW, achievable resulting in an IBW narrower than the operator frequency allocation. Thus, in the specifications the base station is declared and tested for the IBW it supports and to cover the operator spectrum, several base station units might be needed.

The same problem of achieving a large IBW is also applicable to the terminal side, however to cover the whole relevant band several RF front ends in the terminal might be needed, which would increase terminal cost and size negatively.

Figures 1, 5:
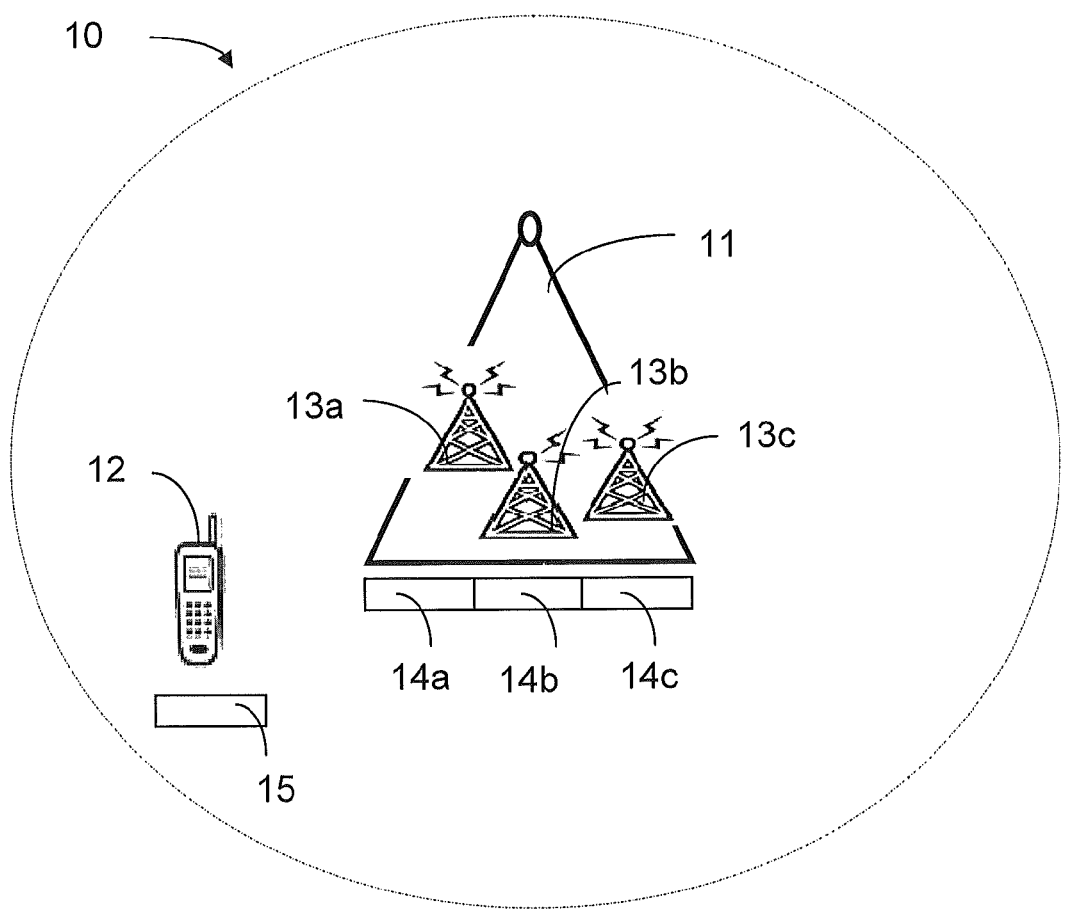
FIG. 1 is a schematic illustration of a mobile communication network including mobile and base station receivers, identifying the difference in mobile terminal, MS, and network node, BS, implementation of wideband technology.
FIG. 5 is a schematic illustration of radio blocks possible to receive by a mobile terminal for the carrier assignment in FIG. 4

FIG. 1 illustrates schematically a cell 10 in mobile communication network, wherein the method for configuring downlink data transmission from a network node, e.g. a base station, to a mobile terminal on at least two carriers may be implemented. The mobile communication network may be any type of public network providing any services to a mobile terminal involving a connection and the communication of signals and data, such as a mobile access network using, e.g., GSM, UMTS, GPRS or LTE standards. For simplicity, this illustration only discloses one base station 11, in the following also denominated as network node or BS, and one mobile station 12, in the following also denominated as mobile terminal or MS. It will be appreciated by the person skilled in the art, that the method according to the present disclosure could be performed in a network including a plurality of network nodes and mobile terminals.

FIG. 1 further illustrates the difference of wideband transmitter and receiver considerations needed for the terminal and base station side. On the base station side, the operator may set up multiple wideband base stations transmitter and receiver units 13a-13c to cover a whole operator spectrum. A mobile terminal, however, will only be capable of simultaneously covering part of the full spectrum, illustrated by the boxes 14a-14c below the respective transmitter and receiver unit 13a-13c, wherein each box represent an instantaneous bandwidth that is part of the operator spectrum. FIG. 1 discloses the example wherein the operator need to set up three base station transmitter and receiver units 13a-c to cover the whole operator spectrum, while the mobile terminal, also known as mobile station, MS, is only capable of simultaneously covering ⅓ of the full spectrum with each receiver path, illustrated by box 15, if only considering reception. For the base station side it is up to the network vendor and operator to supply sufficient equipment to cover used spectrum while the mobile terminal limitations imply that changes to the specification is needed if the instantaneous bandwidth IBW is narrower than the band it is operating in.

The slow frequency hopping in GSM is working on a TDMA frame level and the frequency channel, or Absolute Radio Frequency Channel Number ARFCN, to be used is determined by Mobile Allocation MA, mobile allocation index offset MAIO and Hopping Sequence Number HSN used. The MA, MAIO and HSN determine an absolute frequency channel to be used in each TDMA frame. For non-hopping channels a fixed ARFCN is used.

Figure 3:
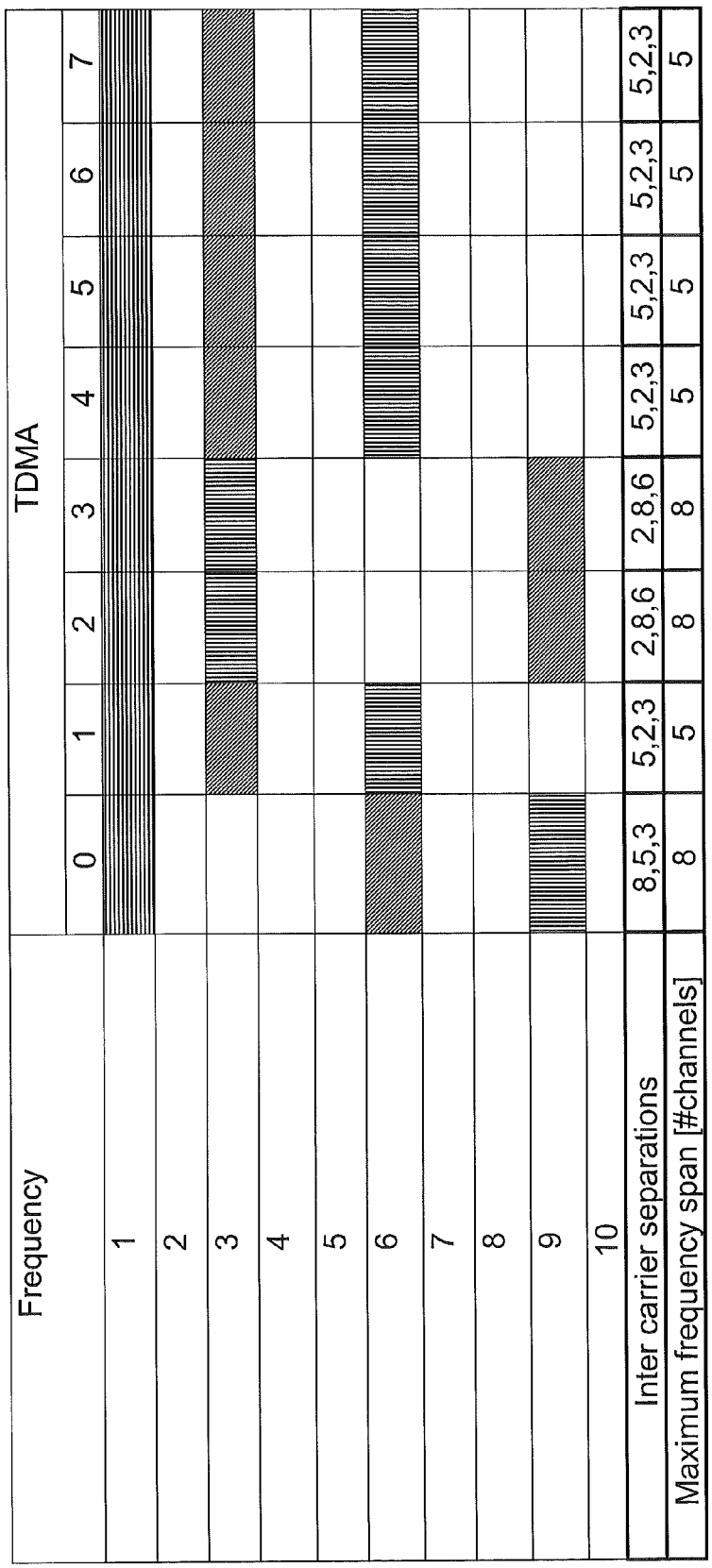
FIG. 3 is an overview of an exemplary frequency TDMA frame distribution for an embodiment of a dual carrier assignment

Using multiple carriers, the same Mobile Allocation MA and Hopping Sequence Number HSN could be used, but different Mobile Allocation Index Offset MAIO to distinguish the different carriers, illustrated with horizontal and diagonal lines in FIG. 3. One of the carriers could be allocated a non-hopping channel, illustrated in with vertical lines in FIG. 3. The non-hopping channel could be the broadcast control channel BCCH. The different allocations may result in a variable inter carrier separation and a variable maximum frequency span, i.e. separation between the lowest and highest frequency carrier, as can be seen in FIG. 3.

Assuming that in the example in FIG. 3, an instantaneous bandwidth of the mobile wideband receiver is limited to 6 carriers (=200 kHz*6=1.2 MHz), it is only in TDMA frame 1, 4, 5, 6, 7 that all three carriers, illustrated with vertical, horizontal and diagonal lines, could be received in the wideband receiver. To receive all carriers in TDMA frame 0, 2, 3 a 1.8 MHz receiver would have been needed.

As follows from FIG. 3, solutions on what carriers to transmit/receive and when to transmit/receive them needs to be included in the specification and communicated between the mobile and network in order to avoid unnecessary transmission from the network node, BS, on resources that cannot be received by the mobile terminal.

Figure 2:
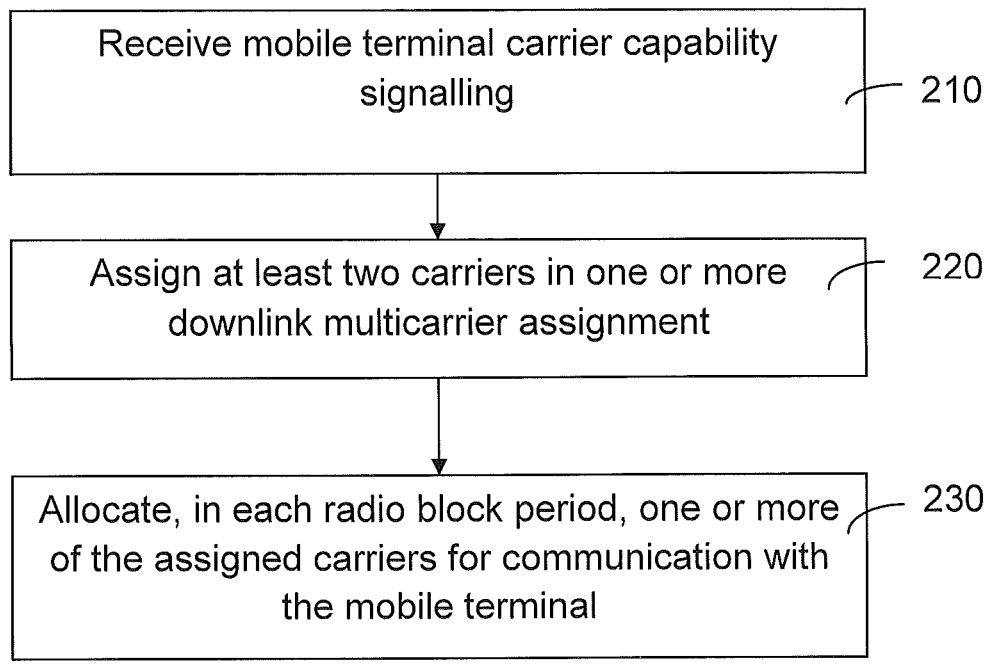
FIG. 2 is a flow chart illustrating embodiments of method steps
 a. discloses further details of the method steps according to FIG. 2,
 b. discloses further details of the method steps according to FIG. 2,
 c. discloses further details of the method steps according to FIG. 2.

FIG. 2 discloses a flowchart of method steps of embodiments for configuring the network for downlink multicarrier data transmission. In its most general form, an embodiment of a method for configuring the network for downlink multicarrier data transmission includes a first step 210 of receiving in the network node a mobile terminal capability signaling from the mobile terminal, a second step 220 of assigning at least two carriers and a third step 230 of determining, in each radio block period, the carriers possible to allocate and to allocate these carriers. The mobile terminal capability signaling includes information on the functionality supported by the mobile terminal. The step of assigning 220 the at least two carriers includes assigning the carriers in one or more downlink multicarrier assignments to the mobile terminal from which mobile terminal capability signaling has been received; the assignments based on the information received in the mobile terminal capability signaling.

If a mobile terminal supports Downlink Dual Carrier with wideband receivers in each receiver chain as discussed herein, then a set of rules as discussed above is needed to ensure that the network and the mobile terminal are aligned regarding which resources shall be used for transmission and reception at each TDMA frame in each radio block period. Different implementation options are possible based on the outlined embodiments above. Either all carriers can be treated as one group with one of the embodiments outlined below for all carriers, or the carriers can be split into two separate groups with separate embodiments applied.

The current dual carrier capability from the mobile terminal is signaled in the MS Radio Access Capability and the MS classmark 3, as described in table 10.5.146 in 3GPP TS 24.008, "Mobile radio interface Layer 3 specification", by the "Multislot Capability Reduction for Downlink Dual Carrier" and the "Downlink Dual Carrier for DTM Capability" indicator. There is also an EFTA Multislot Capability Reduction for Downlink Dual Carrier field defined for MSs supporting the EFTA feature.

Figure 2A:
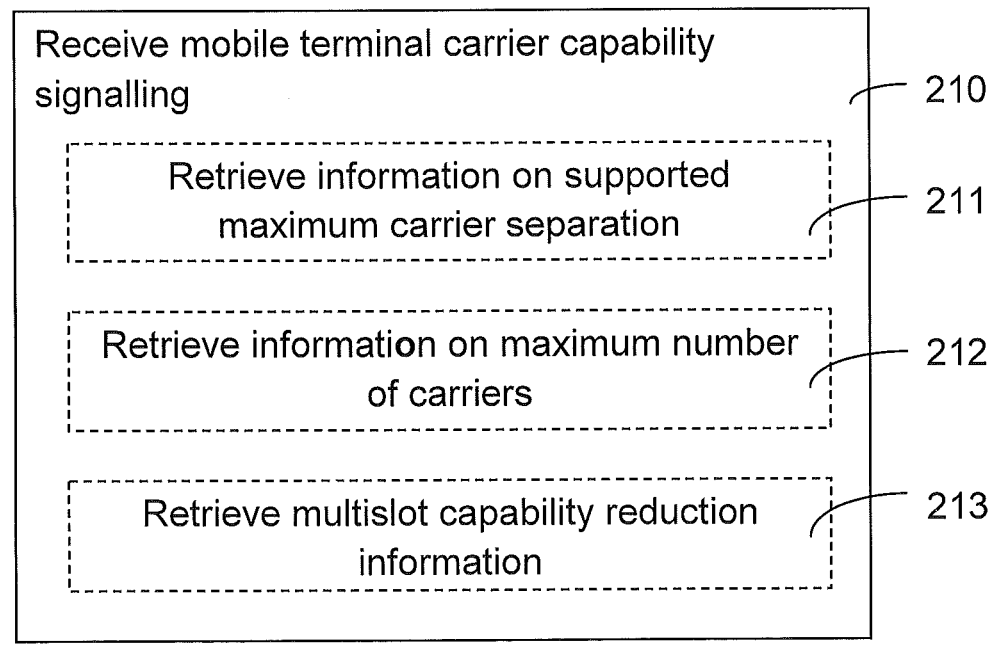

FIG. 2a discloses further aspects of the information included in the mobile terminal capability signaling from the mobile terminal received in step 210. In addition to fields related to current functionality, the mobile terminal capability signaling, in one aspect of the disclosure, involves including information on maximum carrier separation supported by the mobile terminal and/or maximum number of carriers supported. When included in the mobile terminal capability signaling, the information on maximum carrier separation is retrieved in the network node as illustrated in step 211. Information on the maximum number of carriers supported by the mobile terminal is, in a further aspect of the invention, also included in the mobile terminal capability signalling and retrieved as illustrated in step 212.

Reduction of time slots in the mobile reception is mainly done due to limited baseband resources. A mobile terminal might not be capable of receiving double the number of time slots as compared to the situation during a single carrier assignment. A simple approach is to specify an additional "Multi-slot Capability Reduction for Downlink Dual Carrier" from which information on multislot capability reduction is retrieved according to an aspect of the disclosure as illustrated in step 213. Since a maximum number of 6 TS reductions is based on the maximum number of Rx TSs for the highest multislot capability class defined for Downlink Dual Carrier, reducing more TSs, the number of carriers could instead be reduced.

The signaling from the mobile terminal for Multislot Capability Reduction for Downlink Multicarrier is, according to an aspect of the disclosure, performed by means of a 3 bit field.

This field indicates a multislot capability reduction for a wideband receiver of a multicarrier capable mobile terminal applicable to EGPRS and EGPRS2 support when EFTA is not used, see Sub clause B.4 in 3GPP TS 45.002[32]. The reduction applies to the maximum number of downlink timeslots for multicarrier operation derived from the dual transfer mode, DTM, EGPRS (high) multislot class. The field could be coded according to the following three bit coding scheme:

| Bit 3 2 1 | |
|---|---|
| 0 0 0 | No reduction |
| 0 0 1 | The MS supports 1 timeslot fewer than the maximum number of receive timeslots |
| 0 1 0 | The MS supports 2 timeslots fewer than the maximum number of receive timeslots |
| 0 1 1 | The MS supports 3 timeslots fewer than the maximum number of receive timeslots |
| 1 0 0 | The MS supports 4 timeslots fewer than the maximum number of receive timeslots |
| 1 0 1 | The MS supports 5 timeslots fewer than the maximum number of receive timeslots |
| 1 1 0 | The MS supports 6 timeslots fewer than the maximum number of receive timeslots |
| 1 1 1 | Reserved for future use |

Whether or not dual transfer mode, DTM, is supported, is according to an aspect of the disclosure, also signaled by a multicarrier supporting mobile terminal. It is assumed that no extension of the currently used field, Downlink Dual Carrier for DTM Capability, is needed, but the disclosure is not limited by this presumption and the mobile terminal capability signaling could be performed in any suitable way for signaling DTM support.

In order to ensure that an ongoing CS speech call is not impacted by a multicarrier downlink feature, the carrier with the CS allocation need to be received. This aspect need to be included in the determination of the carriers to be received if DTM is supported and used.

The maximum supported number of carriers could be included in the mobile terminal capability signaling to the network. If a MS indicates support of Downlink Dual Carrier and indicates support for a maximum number of four carriers, the total number of carriers supported by the MS is assumed to be four. Up to two can then be allocated without any restrictions in frequency separation, given that the MS has indicated support for Downlink Dual Carrier, i.e. downlink dual carrier configuration according to the present standard. One example of how to define a new 3 bit field for this is outlined below. In the receipt of the mobile terminal capability signaling, the field is identified and interpreted for the retrieval of information of maximum number of carriers according to step 212.

The field indicates the maximum number of carriers supported by a multicarrier receiver and is coded as follows:

| Bit 3 2 1 | |
|---|---|
| 0 0 0 | Maximum number of carriers is 2 |
| 0 0 1 | Maximum number of carriers is 3 |
| 0 1 0 | Maximum number of carriers is 4 |
| 0 1 1 | Maximum number of carriers is 5 |
| 1 0 0 | Maximum number of carriers is 6 |

All other values are reserved for future use and should be interpreted as '100'. The presence of this field also indicates that the mobile terminal supports multicarrier in the downlink for EGPRS The maximum instantaneous bandwidth of the MS is limited by the RF components in the front end receiver. A minimum of 5 MHz is, in this context, assumed needed to cover a sufficient bandwidth supported by a typical GERAN cell where multiple carriers can operate. However, the disclosure is not limited to a minimum bandwidth of 5 MHz and other minimum bandwidths in the MHz range are also applicable according to the disclosure. An upper limit of bandwidth support could be coupled to the supported frequency bands of the MS. The maximum instantaneous bandwidth for downlink multicarrier could be included in the mobile terminal capability signaling as a coded field indicating the maximum receiver bandwidth of a multicarrier receiver. One example of how to define a new 3 bit field for this is outlined below:

| Bit 3 2 1 | |
|---|---|
| 0 0 0 | The relevant bands for each access technology indicated in the Access Technology Type IE is supported by the MS. |
| 0 0 1 | The maximum RF bandwidth is 5 MHz |
| 0 1 0 | The maximum RF bandwidth is 10 MHz |
| 0 1 1 | The maximum RF bandwidth is 15 MHz |
| 1 0 0 | The maximum RF bandwidth is 20 MHz |

All other values are reserved for future use and should be interpreted as the sequence '100'. The information from this field may be identified and interpreted by the network node in order to retrieve information on instantaneous bandwidth.

Following receipt of the mobile terminal capability signaling in a receiving network node, assignment of at least two carriers in one or more downlink multicarrier assignments is performed in step 220 based on the information on mobile terminal capability received in step 210. Assignment of carriers in the downlink multicarrier assignment is performed in a network node receiving the mobile terminal capability signaling. In order for the mobile terminal and network node to know which of the carriers are to be received in each TDMA frame, if the receiver bandwidth does not span all frequencies used in the cell, rules are applied for the cases where not all carriers are covered by the maximum carrier separation supported by the wideband receiver of the mobile terminal. Existing assignment messages, see for example Sub clause 9.1.21f in 3GPP TS 44.018, could be extended to convey the new information regarding the multicarrier assignments.

Currently, when using single carrier or dual carrier transmission on the DL, the uplink status flag, USF, schedules the uplink resource in the next radio block period on the corresponding UL resource, i.e. the same TS and radio frequency channel, on which the USF was transmitted. To allow for the same flexibility in the UL scheduling with multicarrier transmission, as outlined in embodiments described herein, as with Downlink Dual carrier one could assign USFs that schedule resources in the next radio block period, using the same TS, on which the USF was transmitted but using a different radio frequency channel. The alternative USF scheduling would be assigned to the mobile when assigning the multicarrier assignment.

If the carrier falls outside of the signaled supported bandwidth of the mobile, taking the carriers covered by the wideband receiver into account, the burst is assumed to be lost. Any carrier and radio block with at least one burst lost, or a specified number lost, shall not be transmitted by the network node or received by the mobile terminal if only full radio block reception is considered. In the example from FIG. 4 this means both radio blocks are only transmitted for carrier 1, as seen in FIG. 5.

Allocation of carriers for a given downlink multicarrier assignment according to step 220 could in an embodiment of the disclosure include a step 221 of determining carriers to transmit and/or receive, wherein the determination of carriers may be performed based on various aspects exemplified below:

If a non-hopping channel is part of the multicarrier assignments, an aspect of the disclosure includes asserting that this frequency is always included in the receiver bandwidth. The non-hopping channel, usually the BCCH frequency, typically experiences better radio environment and lower frequency diversity, beneficial for some MCSs with high code rate, for example MCS-9).

In accordance with a further aspect of the disclosure, the hopping channels are prioritized depending on e.g. the allocations and Mobile Coding Scheme MCS used. A priority of hopping TCH channels could for example result in more frequent reception of a larger number of carriers.

Figure 2B:
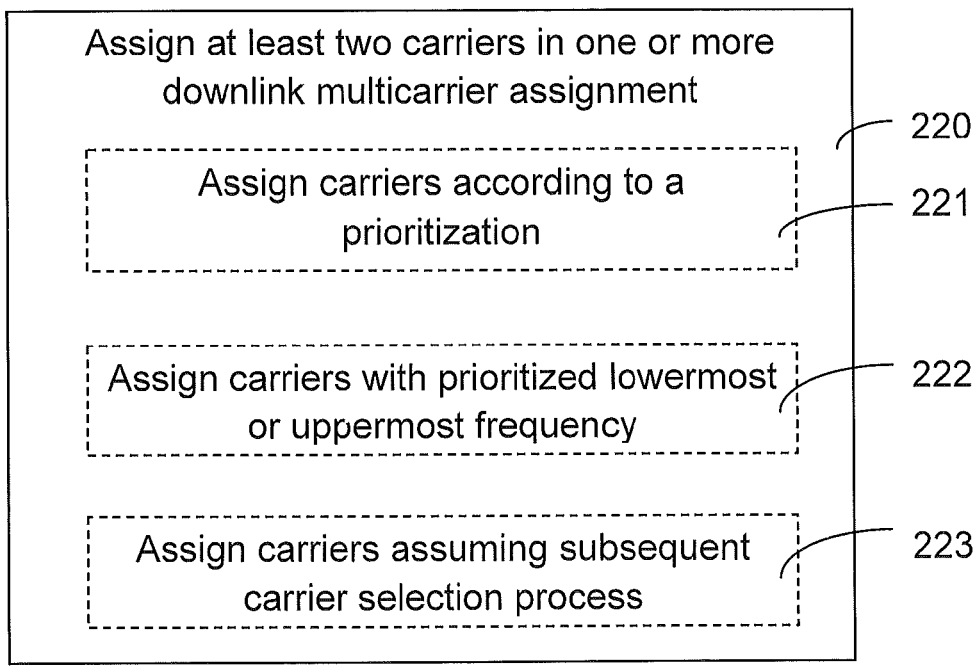

To ease implementation, the network node should indicate the carrier prioritization when signaling the assignment to the mobile terminal, according to an aspect of the disclosure, further illustrated in FIG. 2b. The mobile terminal can then easily determine how the wideband receiver filter should be tuned. Tuning of the wideband receiver filter is performed in each radio block period for each TDMA frame based on the Absolute Radio Frequency Channel Number ARFCN of the prioritized carrier. The ability to decide which carrier to receive for each TDMA frame, is in FIG. 2 represented by steps 221 to 223 disclosing assigning carriers 221 according to a prioritization of one or more carriers, assigning carriers 222 based on a prioritized lowermost or uppermost frequency or assigning carriers 223 assuming a subsequent carrier selection process, e.g. performed in the step of allocating carriers. Determination is made when to transmit and/or receive a specific carrier. In the assignment of carriers in the downlink multicarrier assignment, the network node could indicate if the prioritized carrier is the lowermost or uppermost frequency used in the total assignment. Similarly, when assigning carriers according to a prioritization of one or more of the carriers, an indication of the one or more prioritized carriers would be included in the assignment message.

In FIG. 6 an example carrier assignment to a wideband receiver of 800 kHz, receiver bandwidth illustrated in black, is shown. Carrier 1, illustrated with vertical lines represents a non-hopping carrier. Carrier 2, shown with horizontal lines, and carrier 3, shown with diagonal lines are hopping carriers. In the example of FIG. 6, carrier 2 is used as the prioritized uppermost carrier, i.e., the wideband filter is assumed to have the upper edge tuned to carrier 2.

An alternative way to determine for the mobile terminal how to tune the wideband receiver and also for the network node to assign carriers in a downlink multicarrier assignment that the mobile terminal have a capability to receive, is to base the reception on the lowermost or uppermost active frequency/ARFCN.

Figure 7:
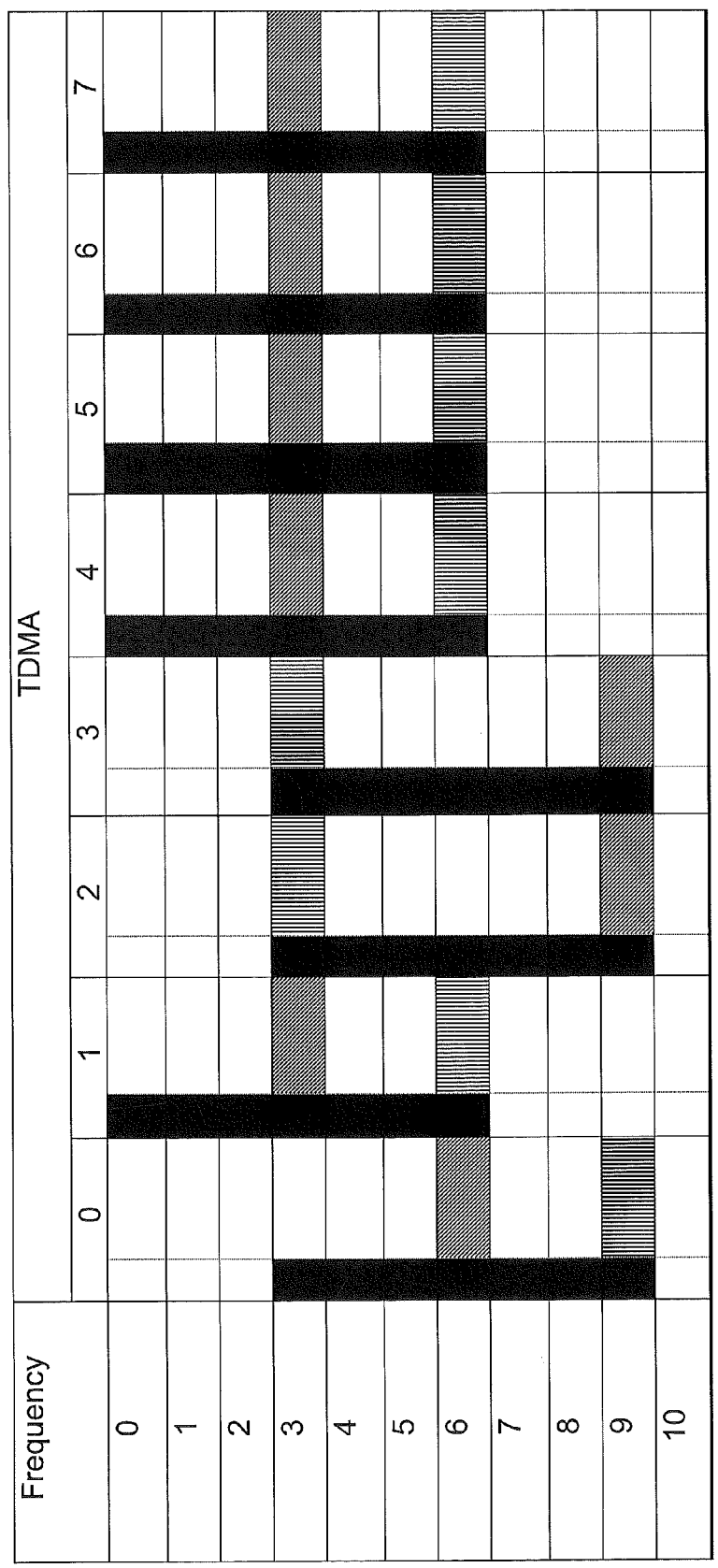
FIG. 7 is a schematic illustration of a two carrier assignment with wideband receiver band width (black), 1.4 MHz; uppermost frequency channel prioritized

In this alternative there is no coupling of the tuning of the receive filter to a specific carrier but rather to tune the frequency channels/ARFCNs used by the transmitting carriers, i.e. tuning the filter to the uppermost/lowermost active ARFCN in each TDMA frame for a specific downlink multicarrier assignment. In FIG. 7 an example of a wideband receiver of 1.4 MHz is shown, receiver bandwidth illustrated in black. Two hopping carriers are illustrated, with carrier 1 shown with horizontal lines, and carrier 2 shown diagonal lines. In the exemplary tuning of the wideband receiver, the uppermost frequency channel is prioritized and used as reference for the wideband receiver in the mobile terminal. As can be seen, both carriers can be received during the two radio blocks, while with the approach used in FIG. 6, carrier 1 would not receive all four bursts of the radio block in the first radio block period.

Figure 2C:
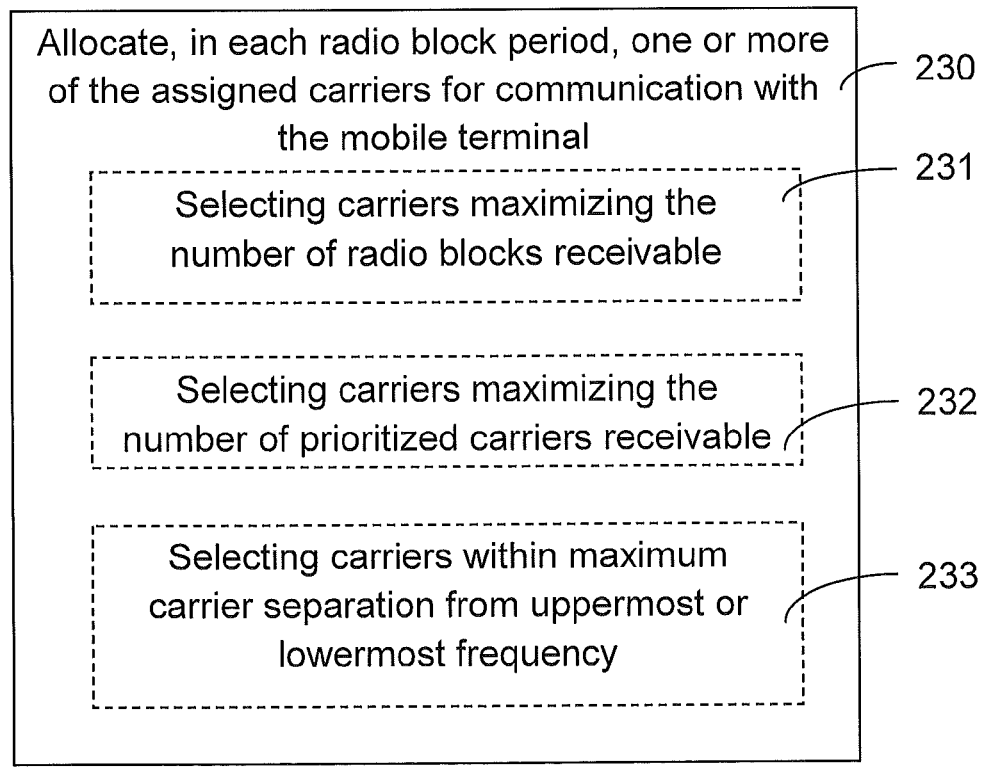

The embodiments outlined above enable easy determination of carrier or frequency channel to tune to with the mobile terminal wideband receiver. The step of allocating 230, in each radio block period, one or more of the assigned carriers for transmission to the mobile terminal concludes the configuration of the network for downlink multicarrier data transmission. However, as described further below, the method may be improved by selecting carriers, in the step of allocating, which asserts that a maximum number of carriers are received in each radio block period. This step is further illustrated in FIG. 2c.

The selection of carriers include selecting carriers 231 maximizing the number or radio blocks receivable, selecting carriers 232 maximizing the number of prioritized carriers receivable and/or selecting carriers 233 within a maximum carrier separation from uppermost or lowermost frequency. Selection could be based on these aspects individually or in any combination of aspects. Further details relating to how such selection may be realized is exemplified in the disclosure below. However, the disclosure is only exemplifying and other ways to achieve selection of carriers is within the scope of the disclosure.

To achieve this, a set of rules could be listed in the specifications to assert the same behavior of the network node and the receiving mobile terminal. The rules would depend on i) the bandwidth of the receiver, ii) the ARFCN used by each carrier in each burst of each radio block, iii) The number of bursts received in each radio block period for each respective carrier.

Thus, in each radio block period, they could constitute to investigate all possible frequencies/carriers that could serve as the bandwidth edge in each TDMA frame, in order to maximize the number of carriers receiving all four bursts of the radio block. If the same number of carriers could be supported by more than one sequence of frequencies/carriers, rules are also needed to make each set of frequency allocation, MA list, MAIOs, HSN determine a unique sequence of frequencies/carriers to be used by the mobile terminal and network node. In such case the wideband filter could be tuned on the lowest frequency or lowest prioritized carrier. One exemplary embodiment of how to determine a carrier assignment and a frequency of the wideband receiver is described below.

The following parameters are used:

c—Number of carriers

ARFCN(c,b)—ARFCN for carrier (c) during burst (b)

WB—Number of frequency channels covered by the wideband receiver filter

Using the following steps:

1. b=0
2. Go through all carriers c=[0,#c−1] to determine the minimum (min(ARFCN(c,b))) and maximum ARFCN (max(ARFCN(c,b))) used in this burst number.
3. For each frequency channel from min(ARFCN(c,b)) to (max(ARFCN(c,b))−#WB+1) record the carriers that are inside a receiver bandwidth of #WB with the lower bandwidth edge at the frequency channel investigated. If (max(ARFCN(c,b))−#WB+1) min(ARFCN(c,b)), only min(ARFCN(c,b)) is investigated.
4. If b<3, increment b (b=b+1) and go to step 1, otherwise go to step 5.
5. Choose a frequency channel in each burst number that maximizes the number of carriers receiving all four bursts.
6. If the same number of carriers can be received with different frequency channels, the lowest carrier number shall be chosen.

Figure 8:
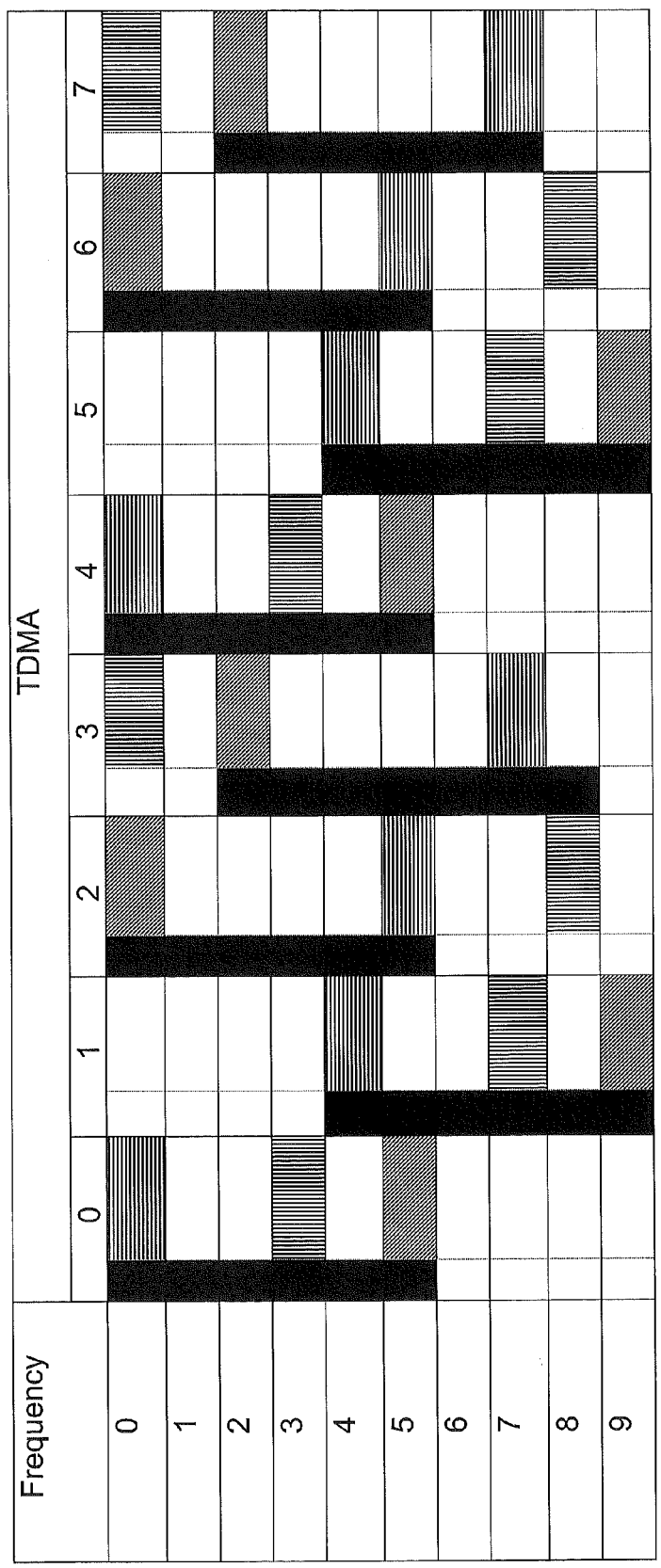
FIG. 8 is a schematic illustration of a two carrier assignment with wideband receiver bandwidth (black), 1.4 MHz; based on maximizing the number of radio blocks received.

In FIG. 8, an example of a wideband receiver of 1.2 MHz is shown, receiver bandwidth illustrated in black. The frequency channel/carrier chosen for the edge of the receive band is based on aiming at receiving the maximum number of carriers in the two radio block periods. In this example carriers 1, illustrated with vertical lines, and carrier 3, illustrated with diagonal lines are chosen. Carrier 2 is illustrated with horizontal lines. Applying the embodiments described above would, in this specific example, result in only one carrier, carrier 3, receiving all four burst in the two radio block periods.

First step 1-5 above are performed with, #WB=6 and #c=3, resulting in the matrix of frequency channels, carriers and burst number for the first radio block period, shown in Table 1 below, using the frequency hopping in FIG. 8. It can be seen that only carrier 1 and 3 can be received in all four bursts and thus the lower edge of the receive filter should be tuned to each of the channels highlighted in gray in table 1 below. In this example tuning to only one frequency channel is allowed per burst, but there could be several alternatives giving rise to the same carriers being received. This allows some flexibility to the mobile terminal on how to tune the wideband receiver but it still assures both the network node and mobile terminal that carrier 1, vertical lines, and carrier 3, diagonal lines, are to be transmitted/received during this radio block period.

To allow for further flexibility of tuning of the receive filter one could modify step 3 above to include frequencies not from min(ARFCN(c,b)) to (max(ARFCN(c,b))−#WB+1) but from min(ARFCN(c,b)) to (max(ARFCN(c,b))).

TABLE 1

Determination of frequency channel to use in each burst number.

| Frequency channel of lower bandwidth edge | Carriers received in each burst (b) | | | |
|---|---|---|---|---|
| | b = 0 | b = 1 | b = 2 | b = 3 |
| 0 | 1,2,3 | 1 | 1,3 | 2,3 |
| 1 | — | 1 | 1 | 3 |
| 2 | — | 1,2 | 1 | 1,3 |
| 3 | — | 1,2 | 1,2 | — |
| 4 | — | 1,2,3 | — | — |
| 5 | — | — | — | — |
| 6 | — | — | — | — |
| 7 | — | — | — | — |
| 8 | — | — | — | — |
| 9 | — | — | — | — |

Since both EGPRS and EGPRS2 have been designed with MCSs having lower code rate than 0.75, one or more bursts of a four burst radio block can be lost and it would still be possible to recover the full radio block, depending on the code rate of the MCS. Lost burst(s) would degrade performance but if it allows transmission of more carriers it might improve the overall user performance compared to having a strict requirement on all four bursts possible to be received. A similar approach taken as in the embodiments described above can also be applied for this case with the requirement that at least three out of four bursts of a radio block shall be within the receiver bandwidth to be classified as valid blocks. For the embodiment described above in the section for maximizing the number of full carriers received, this might also imply a different sequence of frequencies/carriers to be used, and would require a modification of step 5 in determining the carriers to be received.

A further extension of this concept is to maximize the total peak throughput, i.e. maximizing the combined throughput of all carriers. Not transmitting one or more bursts in one radio block is a form of puncturing of the mother convolutional code. It creates new code rates. It can be called burst puncturing. A design criterion for burst puncturing could be to require that the code rate is 1. For example MCS-1 (no piggybacked ACK/NACK (PAN)) and MCS-2 (no PAN) could have one burst removed and the code rates would become 0.70 and 0.88. The resulting code rates would be between those of MCS-2 and MCS-3 or MCS-3 and MCS-4. With higher order modulations even more bursts could be removed. With MCS-5 (no PAN) and MCS-6 (no PAN) up to 2 bursts can be removed and the resulting code rates would be 0.74 and 0.98. Since the lowest code rate in EGRPS/EGPRS2 is 0.37, at most two bursts can be punctured. Thus, the number of channels and/or the hopping patterns may be chosen in such a way that the total combined throughput is maximized. Using EGPRS as an example, assume that a number N4 of channels are guaranteed to have all 4 bursts in a radio block always within the IBW of the receiver, a number N3 of channels are guaranteed to have at least 3 bursts in any radio block within the IBW of the receiver, and a number N2 of bursts are guaranteed to have at least 2 bursts in any radio block within the IBW of the receiver. The total peak throughput is then 59.2*N4+29.6*N3+29.6*N2 kbps (for N4, MCS-9 is assumed and for N3 and N2, MCS-6). The choice of the RF channels can be made so that N2, N3 and N4 maximize the total throughput. The maximization may be performed globally, without any limit on the number of carriers, or constrained on the total number of carriers N4+N3+N2 not exceeding a predetermined number, such as the total number of carriers available at the transmitter.

Another possibility is to choose the hopping frequencies for each radio channel by allowing always burst puncturing while maximizing the number of radio blocks that receive all 4 bursts.

Rateless codes can also be obtained by burst puncturing. If 3 or 4 bursts in a radio block are punctured then the EGPRS/EGPRS2 block can't be decoded by itself. However, the block can be decoded provided a sufficient number of retransmissions are made. This type of transmission can be useful for applications that tolerate delays. Rateless codes allow the allocation of a larger number of carriers to the mobile terminal and an increase of total combined peak throughput.

The link quality control algorithms in the network node, BS, can be modified to include the new code rates. For example Modulation and Coding Scheme 6, MCS-6, with 2 bursts punctured and MCS-9 have almost the same code rate (0.98 resp. 1). Similarly, MCS-5 with two bursts punctured and MCS-7 have almost the same code rate (0.76 resp. 0.74). If MCS-7 is the optimum modulation and coding scheme for the radio conditions, then MCS-5 with 2 bursts punctured might also be used.

Incremental redundancy can be modified to take into account burst puncturing. If a repetition must be sent in a radio block with one or more punctured bursts, then the MCS of the repetition can be chosen so that it is self-decodable and it belongs to the same family as the first transmission. For example, suppose the first transmission used MCS-6 (using all 4 bursts) and a repetition must be sent with 2 punctured bursts. Then a retransmission can be sent using MCS-6 or MCS-3 (Family A). However, only the retransmission with MCS-6 could be decoded on its own or be used for incremental redundancy with the first transmission.

On the receiver side, the mobile terminal can use the hopping pattern to discover which are the punctured bursts within any given radio block. The mobile terminal will set the soft values for all the code bits within the punctured burst to zero. Therefore burst puncturing requires only simple modifications of the EGPRS/EGPRS2 equalization and decoding algorithms in the mobile terminal.

For the different alternatives of embodiments outlined, step 5, described above, need to be modify to cater for, for example the reception of radio blocks with three bursts received. A number of priorities need, in that case, be specified that for example first maximize the number of carriers with four burst receptions, followed by maximization of three burst reception over the radio block period.

With the multicarrier set up including the at least two carriers, there is a need for extended or new reports on mobile terminal quality measurements to convey the measurements to the network. Also, the existing measurement report assignments regarding the type and report contents that shall be provided by the mobile terminal should be extended or new messages introduced to convey the new assignments. Another alternative would be to broadcast the measurement report related information regarding the reporting details in the existing or new system information.

To avoid impact on the mobile quality measurements the bursts not received shall be excluded from the quality measurements, such as MEAN_BEP, from the mobile terminal to the network node.

Figures 4, 9:
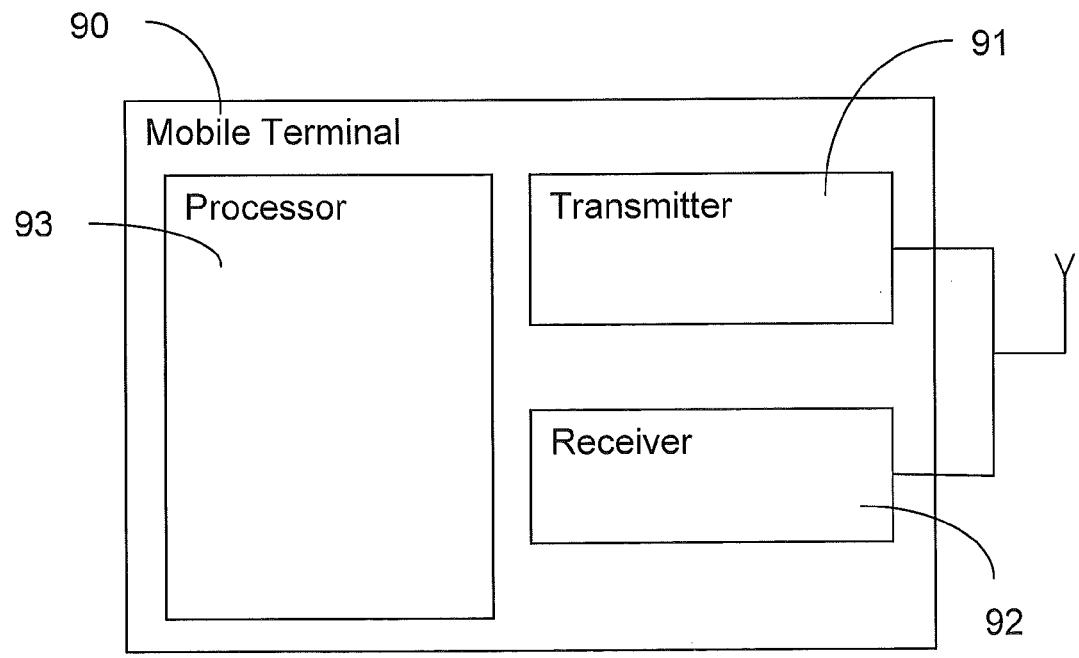
FIG. 4 is a schematic illustration of burst reception in the mobile terminal wideband receiver
FIG. 9 is a block diagram illustrating an embodiment of a mobile terminal

FIG. 9 discloses a mobile terminal 90 configured to receive downlink data transmission on at least two carriers. The mobile terminal includes one or more transmitters 91 configured to send mobile terminal capability signalling, e.g. in a MS Radio Access Capability and the MS classmark 3, as for example described in table 10.5.146 in 3GPP TS 24.008. One or more tunable wideband receivers 92 in the mobile terminal are configured to receive downlink data transmission from a network node on at least two carriers. Tuning of the wideband receiver is controlled by the processor 93 based on information retrieved from a downlink multicarrier assignment signal received from the network node.

Figure 10:
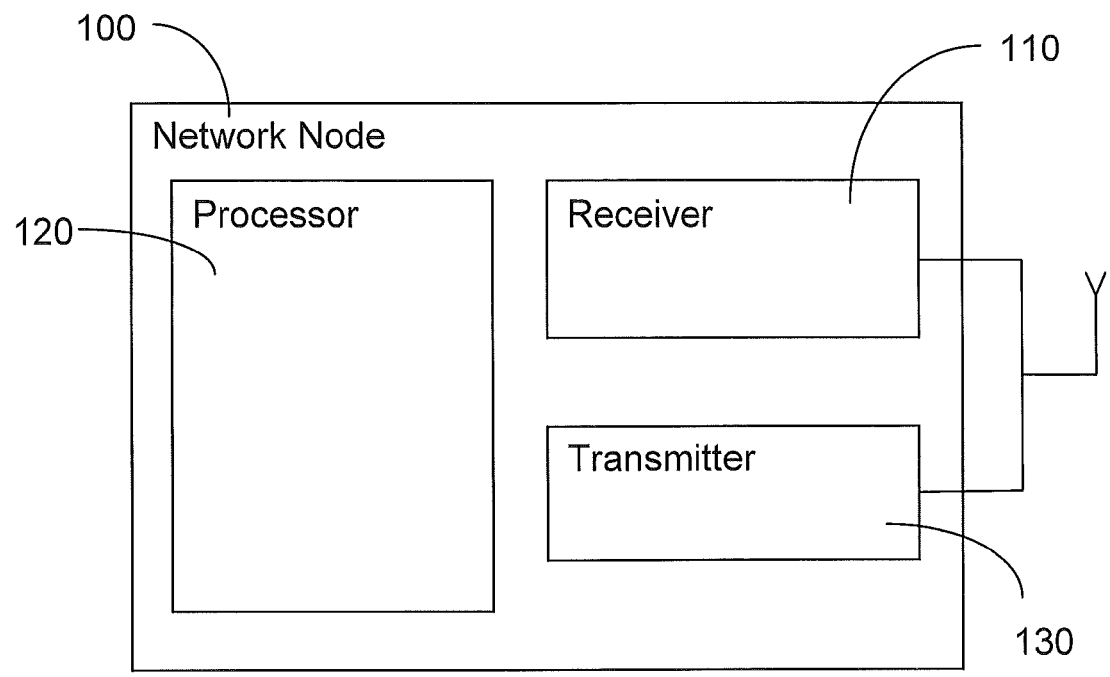
FIG. 10 is a block diagram illustrating an embodiment of a network node

FIG. 10 discloses a network node 100 in a mobile communication network, configured for downlink data transmission to a mobile terminal on at least two carriers. The network node includes one or more receivers 110 for receiving a mobile terminal capability signal. A processor 120 in the network node is arranged to process the mobile terminal capability signal, to assign at least two carriers in one or more carrier assignments based on information received in the mobile terminal capability signal and to allocate, in each radio block period, at least two of the assigned carriers for transmission to the mobile terminal. The network node also includes a transmitter 130 for transmitting at least one assignment message signaling the carrier assignment to a receiving mobile terminal.

Figure 11:
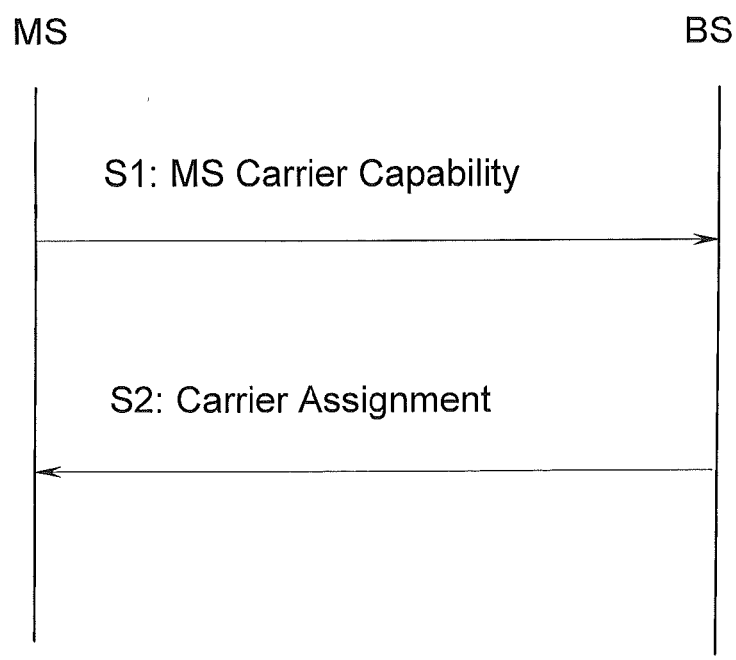
FIG. 11 is a signalling diagram illustrating an exemplary exchange of signals between a network node and a mobile terminal It should be added that the following description of the embodiments is for illustration purposes only and should not be interpreted as limiting the disclosure exclusively to these embodiments/aspects.

FIG. 11, discloses a signalling diagram for the mobile terminal capability signalling and the following carrier assignment from the network node. In a first signal S1, the mobile terminal, MS, signals a mobile terminal capability. The mobile terminal capability signal is received and processed in the network node, BS. The network node assigns at least two carriers in a downlink multicarrier assignment, and signals the carrier assignment in one or more assignment messages S2.

ABBREVIATIONS

3GPP 3rd Generation Partnership Project
ARFCN Absolute Radio Frequency Channel Number
BCCH Broadcast Control Channel
BS Base Station
DL Downlink
DTM Dual Transfer Mode
EDGE Enhanced Data rates for Global Evolution
GERAN GSM/EDGE Radio Access Network
GSM Global System for Mobile Communication
HSN Hopping Sequence number
IBW Instantaneous bandwidth
LTE Long Term Evolution
MA Mobile Allocation
MAIO Mobile Allocation Index Offset
MCS Modulation and Coding Scheme
MS Mobile Station
PAN Piggy-backed Ack/Nack
TCH Traffic Channel
TDMA Time Division Multiple Access
WCDMA Wideband Code Division Multiple Access
UL Uplink
USF Uplink Status Flag

The invention claimed is:

1. A method in a mobile communication network for configuring the network for downlink multicarrier data transmission from a network node to a mobile terminal, the method comprising:

receiving, in the network node, mobile terminal capability signalling from the mobile terminal;

assigning to the mobile terminal, at least two carriers in one or more downlink multicarrier assignments based on information received in the mobile terminal capability signalling; and allocating, in each radio block period, one or more of the assigned carriers for communication with the mobile terminal, by selecting carriers that maximize a number of radio blocks received so that a maximum number of carriers are received by the mobile terminal, or that maximize a number of prioritized carriers received by the mobile terminal, wherein the allocating comprises selecting a number N4 of carriers that will have four bursts in a radio block always with smaller or equal carrier separation compared to a signalled maximum carrier separation of the mobile terminal, a number N3 of carriers that will have at least three bursts in any radio block with smaller or equal carrier separation compared to the signalled maximum carrier separation of the mobile terminal, and a number N2 of carriers that will have at least two bursts in any radio block with smaller or equal carrier separation compared to the signalled maximum carrier separation of the mobile terminal.

2. The method according to claim 1, wherein the receiving mobile terminal capability signalling comprises receiving information on supported maximum carrier separation for the mobile terminal.

3. The method according to claim 1, wherein the receiving mobile terminal capability signalling comprises receiving information on maximum number of carriers supported by the mobile terminal.

4. The method according to claim 1, wherein the receiving mobile terminal capability signalling comprises receiving multi-slot capability reduction information on maximum number of downlink carriers.

5. The method according to claim 1, wherein the assigning comprises including information on the assignment of the at least two carriers, in each of one or more assignment messages.

6. The method according to claim 1, wherein the assigning at least two carriers in one or more downlink multicarrier assignments comprises assigning carriers according to a prioritization of one or more of the at least two carriers and indicating which of the at least two carriers are the one or more prioritized carriers in the carrier assignment.

7. The method according to claim 1, wherein the assigning at least two carriers in one or more downlink multicarrier assignments further comprises assigning carriers with a prioritized lowermost or uppermost frequency and indicating the prioritized lowermost or uppermost frequency in the carrier assignment.

8. The method according to claim 1, wherein the assigning at least two carriers in one or more downlink multicarrier assignments comprises assigning carriers based on an expected subsequent carrier selection process in the allocation of carriers.

9. The method according to claim 1, wherein the allocating comprises determining, in each radio block period, carriers of the mobile terminal usable to receive and carriers of network node usable for assignment to the mobile terminal.

10. The method according to claim 1, wherein the allocating comprises selecting carriers within a supported maximum carrier separation from an uppermost frequency or a lowermost frequency.

11. The method according to claim 1, wherein the allocating further comprises selecting carriers that maximize the number of carriers that will be able to receive all four bursts in a given radio block period with a smaller or equal separation compared to a supported maximum carrier separation.

12. The method according to claim 1, wherein the allocating further comprises selecting carriers among the assigned at least two carriers based on a set of rules that are predefined-the rules are derived from any one of or any combination of:
    i) the supported maximum carrier separation of the mobile terminal receiver;
    ii) an absolute radio frequency channel number of each respective carrier;
    iii) a number of bursts received in each radio block period for each respective carrier in each TDMA frame;
    iv) the prioritization of the assigned at least two carriers;
    v) and a signalled prioritization of frequencies to be received.

13. The method according to claim 9, further comprising maximizing the combined throughput through all carriers.

14. A mobile terminal in a mobile communication network comprising:
    at least one transmitter configured to send mobile terminal capability signalling;
    at least one receiver configured to receive data transmission from multiple downlink carriers from a network node; and
    a processor configured to control the at least one receiver for reception of data transmission on at least two carriers according to a downlink multicarrier assignment signalled from the network node, and to determine which of at least two assigned carriers are allocated by the network in each radio block period to maximize a number of radio blocks received so that a maximum number of carriers are received by the mobile terminal, or that maximize a number of prioritized carriers received by the mobile terminal,
    wherein the at least two assigned carriers are allocated by the network based on selecting a number N4 of carriers that will have four bursts in a radio block always with smaller or equal carrier separation compared to a signalled maximum carrier separation of the mobile terminal, a number N3 of carriers that will have at least three bursts in any radio block with smaller or equal carrier separation compared to the signalled maximum carrier separation of the mobile terminal, and a number N2 of carriers that will have at least two bursts in any radio block with smaller or equal carrier separation compared to the signalled maximum carrier separation of the mobile terminal.

15. A network node in a mobile communication network, configured for downlink multicarrier data transmission to a mobile terminal, the network node comprising:
    at least one receiver configured to receive a mobile terminal capability signal;
    a processor configured to process the mobile terminal capability signal, to assign at least two carriers in one or more carrier assignments based on information received in the mobile terminal capability signalling, to allocate, in each radio block period, at least two of the assigned carriers for communication with the mobile terminal; and
    at least one transmitter configured to transmit at least one assignment message signalling the carrier assignment to a receiving mobile terminal,
    wherein the at least two of the assigned carriers are allocated by selecting carriers that maximize a number of radio blocks received so that a maximum number of carriers are received by the mobile terminal, or that maximize a number of prioritized carriers received by the mobile terminal, wherein the at least two assigned carriers are allocated based on selecting a number N4 of carriers that will have four bursts in a radio block always with smaller or equal carrier separation compared to a signalled maximum carrier separation of the mobile terminal, a number N3 of carriers that will have at least three bursts in any radio block with smaller or equal carrier separation compared to the signalled maximum carrier separation of the mobile terminal, and a number N2 of carriers that will have at least two bursts in any radio block with smaller or equal carrier separation compared to the signalled maximum carrier separation of the mobile terminal.

* * * * *